D. M. NESBIT.
AUTOMATIC REGULATOR FOR STEAM AND OTHER HEATING SYSTEMS.
APPLICATION FILED OCT. 29, 1909.
1,009,926.
Patented Nov. 28, 1911.
2 SHEETS—SHEET 2.
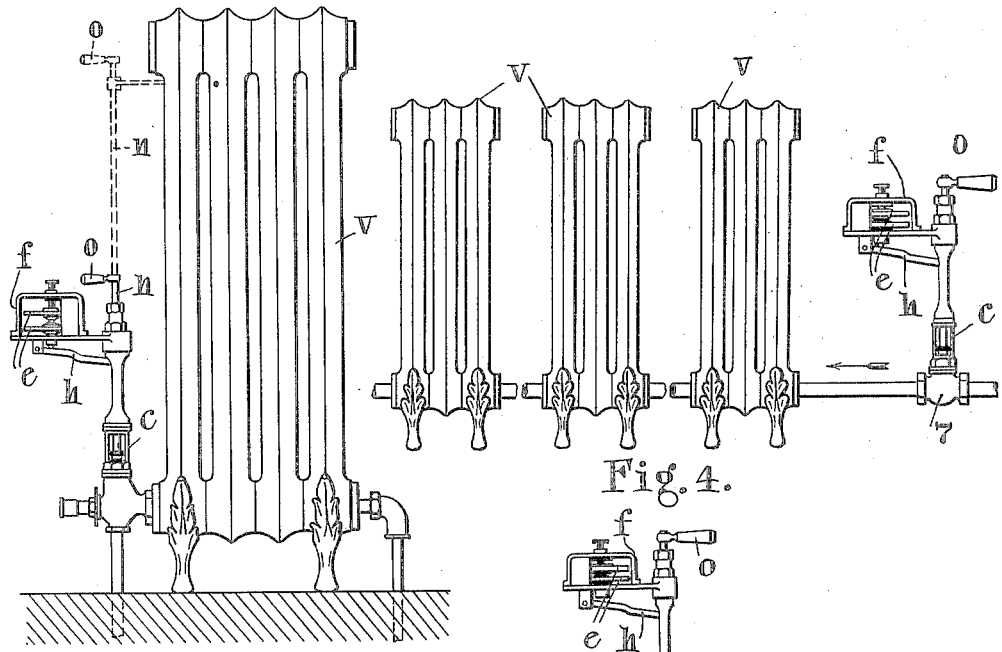
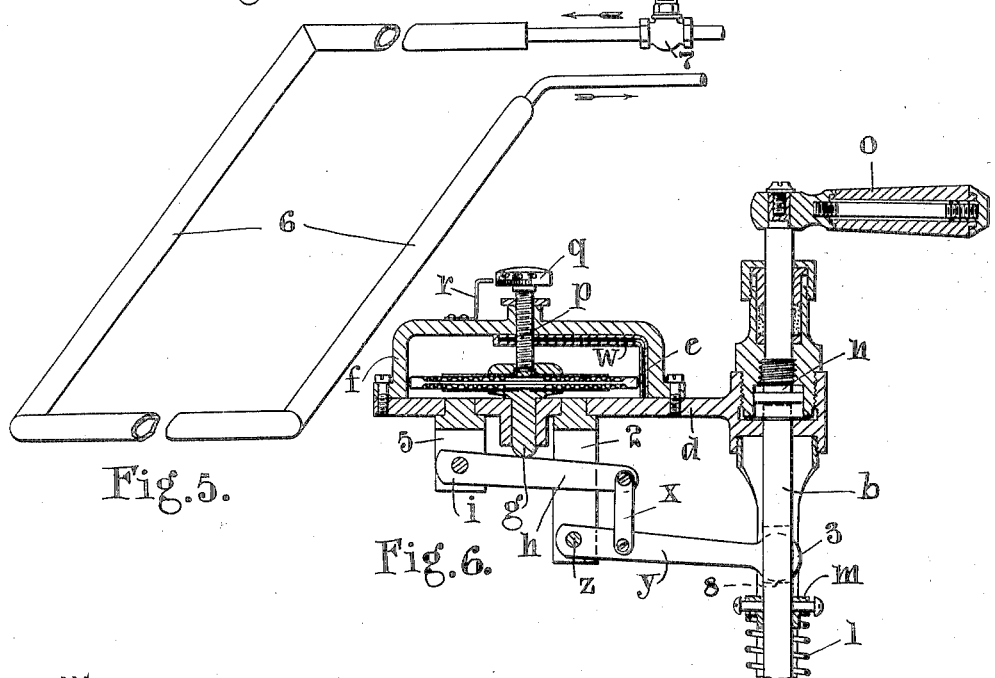

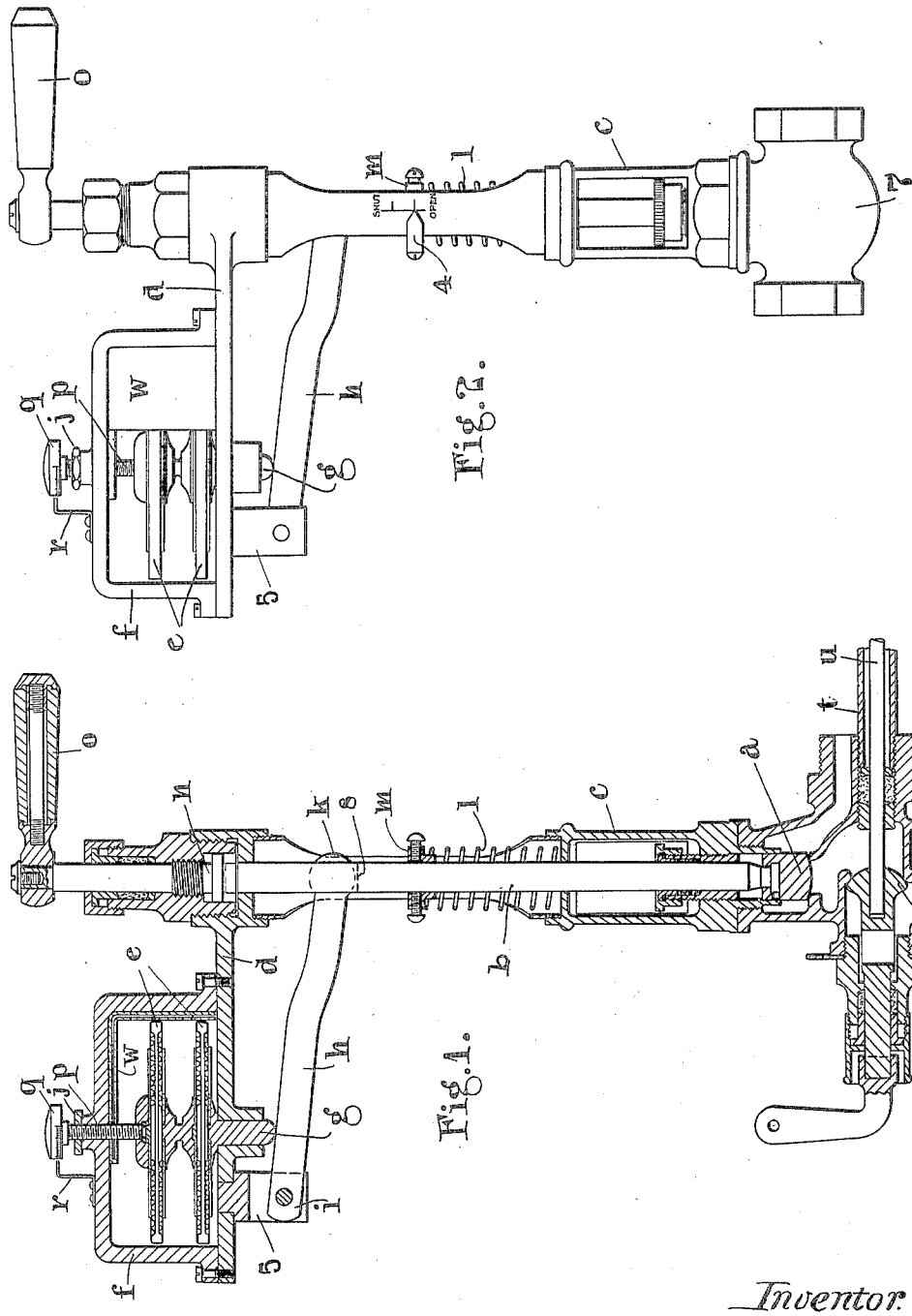

UNITED STATES PATENT OFFICE.

DAVID MEIN NESBIT, OF LEICESTER, ENGLAND.

AUTOMATIC REGULATOR FOR STEAM AND OTHER HEATING SYSTEMS.

1,009,926.  Specification of Letters Patent.  Patented Nov. 28, 1911.

Application filed October 29, 1909. Serial No. 525,370.

*To all whom it may concern:*

Be it known that I, DAVID MEIN NESBIT, a subject of the King of Great Britain and Ireland, and residing at Barkby Lane, Leicester, in the county of Leicester, England, have invented certain new and useful Improvements in and Connected With Automatic Regulators for Steam and other Heating Systems, of which the following is a specification.

This invention relates to devices for automatically regulating the supply or exit of the heating fluid to or from radiators or other units in a heating system whether the heating fluid be steam, vapor or hot water.

The invention has particular reference to the type of regulator in which a highly volatile fluid is inclosed within a flexible diaphragm or like chamber, and the expansion and contraction of the diaphragm is utilized to control a valve regulating the flow of heating fluid. In devices of this type it has been used for the diaphragm chamber to control a small valve which in turn controls the supply of compressed air or other fluid or an electric current which operates upon the valve regulating the supply of heating fluid.

The object of the present invention is to enable the device containing the highly volatile fluid to directly act upon the valve without necessitating the use of compressed air or other fluid, thus enabling the regulator to be used upon systems where no pumps are available or in other positions where a supply of compressed air or a source of low pressure is not conveniently obtainable.

The invention consists in mounting one or a plurality of diaphragm chambers containing highly volatile fluid within a suitable frame and adapting the same to actuate suitable transmitting and multiplying means, directly connected to the controlling valve for the heating fluid, whereby the small movement of the chambers due to changes in temperature is multiplied to give the requisite movement to the said valve.

The invention also consists in the various details hereinafter referred to for enabling the regulating valve to be manipulated by hand irrespective of the automatic device when required, and also to permit of the regulation or adjustment of the chambers to suit the required temperatures at which the valve is to operate.

In the accompanying drawings, Figures 1 and 2 are respectively a side sectional elevation and a side elevation of a regulator arranged according to one mode of carrying out the invention the valve being shown in the closed position. Fig. 3 illustrates the application of such a regulator to a single radiator. Fig. 4 illustrates the application of a regulator to a series of radiators. Fig. 5 illustrates the application to a coil or to a section of a heating system or to a complete system which is diagrammatically indicated. Fig. 6 illustrates a modification in which a system of levers is used to operate the valve.

In carrying out the invention according to one mode, for instance, in the application to the control of the supply of steam to a single radiator in a steam heating system and as illustrated in Figs. 1 to 3, a suitable valve, $a$, having a sliding spindle $b$ is provided within a casing $c$ upon which a bracket $d$ is mounted. The bracket $d$ supports a number of diaphragm chambers $e$ containing highly volatile fluid. The diaphragm chambers $e$ are superimposed and preferably connected together in the manner indicated. They may be arranged within a frame $f$ screwed to the bracket $d$ in such a manner that the frame $f$ may be easily removed and be replaced by a deeper one if necessary in order to enable the number of diaphragm chambers $e$ to be increased. The lowermost diaphragm chamber $e$ is provided with a central pin $g$ bearing upon a lever $h$ one end $i$ of which is pivoted to a lug 5 on the bracket $d$ while the other end $k$ is in engagement with a slot 8 in the valve spindle $b$. The pin $g$ is preferably arranged to bear much nearer to the fulcrum of the lever $h$ than to the other end of the same, in order that the small movement due to the expansion and contraction of the diaphragm chambers $e$ may be multiplied to give the requisite movement to the valve spindle $b$. The valve $a$ is preferably of the type which is opened by a spring such as $l$ abutting against the upper part of the valve casing $c$ and against a collar $m$ secured to the valve spindle $b$. The spring $l$ in the example illustrated therefore acts against the lever $h$ when an expansion of the diaphragm chambers $e$ tends to close the valve $a$. The converse arrangement, however, may be adopted if desired.

In order to permit of manipulation of the valve $a$ by hand when necessary a screwed spindle $n$ fitted with a handle $o$ may bear upon the end of the valve spindle $b$.

Regulation of the diaphragm chambers $e$ may be effected by an adjusting screw $p$ so that the range of temperatures within which the valve $a$ is to be operated may be regulated as desired. The head $q$ of the screw $p$ may be provided with a scale of temperatures a pointer $r$ being fitted to the frame $f$ to indicate the temperature at which the valve $a$ is set to operate. The screw $p$ may be fitted with a locking arrangement $j$ in order to prevent unauthorized adjustment or tampering with the regulator, and the shut off handle $o$ may be similarly treated. The valve spindle $b$ may be fitted with a pointer 4, to show when the valve is opened or closed.

Instead of using one lever between the diaphragm chamber $e$ and the valve $a$ a compound system of levers may be used when greater movement is required or when only one diaphragm chamber is used, as shown in Fig. 6, in which the lever $h$ is connected by means of the link $x$ to a second lever $y$ pivoted at $z$ to a lug 2 mounted on a bracket $d$ the other end 3 of the lever $y$ engaging the slot 8 in the spindle $b$ of the valve $a$. The connection between the diaphragm chambers and the valve may also be varied to suit the type of regulating valve employed.

The regulating valve $a$ may be a simple valve depending solely upon the diaphragm chambers and the shut-off handle $o$ for its movement, or it may be of the type described in specifications Nos. 829691 and 869612, that is to say, the diaphragm chambers $e$ may control the valve $a$ which regulates the flow of fluid to or from the second valve $s$ which is operated by expansion members $t$ $u$ or other automatic devices depending in their operation upon the variations in temperature.

The regulator may be mounted directly upon a radiator as shown in Fig. 3, and in order to prevent undue influence of the radiator $v$ on the diaphragm chambers $e$ the latter may be shielded by a shield $w$ of asbestos or other non-conducting material preferably incased in sheet metal deflectors, of semicylindrical or other convenient shape.

In Figs. 2, 4 and 5 the connection 7 to the heating system is shown as a straight two-way connection instead of the connection shown in Figs. 1 and 3.

The screwed spindle $n$ may be short as indicated in full lines in Figs. 1 to 3 or may be lengthened as indicated in dotted lines in Fig. 3 in order to bring it within reach when the valve or regulator is at the lower part of the radiator or in any other like inconvenient position.

Instead of the regulator being applied to the control of a single radiator as above described it may be used to control the supply pipe of a series of radiators $v$ as indicated in Fig. 4 or it may be used to control a section of a heating system or a complete system or a coil 6 as indicated diagrammatically in Fig. 5. It may be used with particular advantage in connection with a system such as described in British specification No. 8592/03.

When the invention is applied to hot water systems a plain butterfly, flap valve or any other suitable type of valve may be used.

The invention is not confined to any special type of expansion chambers or fluid contained in the same or to their disposition with regard to the valve, as these details may be varied to suit the type of regulating valve employed and the amount of movement required for the latter.

Having now described my invention what I claim as new and desire to secure by Letters Patent is:

1. In a device for automatically regulating the passage of heating fluid in a heating system, the combination of a plurality of diaphragm chambers, a frame carrying said chambers, a bracket carrying said frame, a casing carrying said bracket, a spring-actuated controlling valve working in said casing, a sliding spindle carried by said valve, a lever engaging said spindle and pivoted on said bracket, a pin on one of said diaphragm chambers adapted to engage the said lever whereby the said valve is operated, a screwed spindle connected to said diaphragm chambers, a pointer secured to the said frame, a head for adjusting said diaphragm chambers, and gradations on said head co-acting with said pointer whereby the temperature at which the valve is operated, is indicated.

2. In a device for automatically regulating the passage of a heating fluid in a heating system, the combination of a plurality of diaphragm chambers, a frame carrying said chambers, a bracket carrying said frame, a casing carrying said bracket, a spring actuated controlling valve working in said casing, a sliding spindle carried by said valve, a lever engaging said spindle and pivoted to said bracket, a pin on one of said diaphragm chambers adapted to the said lever whereby the said valve is operated, a screwed spindle engaging said valve spindle, and a handle on said screwed spindle whereby the said valve may be operated by hand when desired.

In testimony whereof I have signed my name to this specification in the presence of two subscribing witnesses.

DAVID MEIN NESBIT.

Witnesses:
 WALTER W. BALL,
 WILFRED OLDHAM.